US012626541B2

(12) United States Patent (10) Patent No.: US 12,626,541 B2
Maitre et al. (45) Date of Patent: May 12, 2026

(54) MESH VEHICLE NETWORK TO SHARE AND REPORT LARGE DATA LOGS TO BACKEND SERVERS

(71) Applicant: Volvo Truck Corporation, Gothenburg (SE)

(72) Inventors: Julien Maitre, Chuzelles (FR); Yann Quibriac, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 95 days.

(21) Appl. No.: 18/586,251

(22) Filed: Feb. 23, 2024

(65) Prior Publication Data

US 2024/0290141 A1 Aug. 29, 2024

(30) Foreign Application Priority Data

Feb. 24, 2023 (EP) ..................................... 23158488

(51) Int. Cl.
| | |
|---|---|
| *G07C 5/00* | (2006.01) |
| *H04L 67/12* | (2022.01) |
| *H04L 67/61* | (2022.01) |
| *H04W 4/46* | (2018.01) |
| *H04W 84/12* | (2009.01) |

(52) U.S. Cl.
CPC .............. *G07C 5/008* (2013.01); *H04W 4/46* (2018.02); *H04W 84/12* (2013.01)

(58) Field of Classification Search
CPC ........ G07C 5/008; H04W 4/46; H04W 84/12; H04W 88/04; H04W 4/44; H04W 4/40; H04L 67/61; H04L 67/12

USPC .......................................................... 701/33.4
See application file for complete search history.

(56) References Cited

U.S. PATENT DOCUMENTS

| | | | | |
|---|---|---|---|---|
| 9,226,004 B1* | 12/2015 | Plante | .................... | H04N 7/183 |
| 2007/0132773 A1* | 6/2007 | Plante | .................. | G07C 5/0891 |
| | | | | 345/564 |
| 2013/0078945 A1* | 3/2013 | Lavi | ...................... | H04W 84/22 |
| | | | | 455/418 |
| 2019/0253853 A1* | 8/2019 | Makled | .................. | H04W 4/029 |
| 2020/0043068 A1* | 2/2020 | McQuade | .............. | G06Q 30/08 |

(Continued)

OTHER PUBLICATIONS

Extended European Search Report for European Patent Application No. 23158488.9, mailed Sep. 13, 2023, 9 pages.

*Primary Examiner* — Tyler D Paige
(74) *Attorney, Agent, or Firm* — Sage Patent Group

(57) ABSTRACT

A computer-implemented method for acquiring log data related to operation of a vehicle electronic system, comprising: acquiring, by a processor of an electronic system installed in a first vehicle, log data related to operation of the vehicle electronic system; storing, by the processor, the log data in a buffer memory of the first vehicle; selecting, by the processor, log data among the log data stored in the buffer memory; transmitting, by the processor, the selected log data to a remote server through a wide area network, a free space or a space in the buffer memory occupied by the transmitted log data being usable to store newly acquired log data; establishing a transmission link through a wireless local area network with a communication circuit installed in a second vehicle; and transmitting, by the processor, non-selected log data stored in the buffer memory to the access point through the transmission link.

13 Claims, 4 Drawing Sheets

(56)                    References Cited

U.S. PATENT DOCUMENTS

2022/0086101 A1*  3/2022  Otaka  ................. H04L 49/9047
2024/0290141 A1*  8/2024  Maitre  ................... H04W 4/46

* cited by examiner

MESH VEHICLE NETWORK TO SHARE AND REPORT LARGE DATA LOGS TO BACKEND SERVERS

CROSS REFERENCE TO RELATED APPLICATION

This application claims foreign priority to European Application No. 23158488.9 filed on Feb. 24, 2023, the disclosure and content of which is incorporated by reference herein in its entirety.

TECHNICAL FIELD

The disclosure relates generally to vehicle data acquisition in development phases of vehicle electronic systems for debugging purposes and in customer support cases for diagnostic purposes. In particular aspects, the disclosure relates to data acquisition for the development and behavior debugging of driver assistance systems and self-driving vehicles. The disclosure can be applied to light, medium and heavy-duty vehicles, such as trucks, buses, and construction equipment, among other vehicle types. Although the disclosure may be described with respect to a particular vehicle, the disclosure is not restricted to any particular vehicle.

BACKGROUND

Existing solutions are already designed to retrieve many vehicle parameters. However, those parameters do not cover all use cases to trace faults or debug complex vehicle electronic systems such as driver assistance systems and self-driving systems. In such systems, many parameters need to be captured in real time and transmitted to a back-end server (generally from the vehicle manufacturer). Vehicle embedded processing systems and networks have an increasingly high speed. Thus, the amount of data to be logged and transmitted is huge especially regarding the available bandwidth through the cellular data networks (3G, 4G). In addition, the bandwidth of the cellular data networks is not constant and varies depending on the network performance and load. The memory of one or more of the vehicle processing systems can be used as a buffer to store logged data to be transmitted. However, such a use is limited when the data are produced at a higher rate than the network can transmit.

Accordingly, there is a need to capture high volume of data in a vehicle and to transmit them to a back-end server.

SUMMARY

According to a first aspect of the disclosure, a computer-implemented method for acquiring log data related to operation of a vehicle electronic system, the method comprising: acquiring, by a processor of an electronic system installed in a first vehicle, log data related to operation of the vehicle electronic system; storing, by the processor, the log data in a buffer memory of the electronic system of the first vehicle; selecting, by the processor, log data among the log data stored in the buffer memory; transmitting, by the processor, the selected log data to a remote server through a wide area network, a free space or a space in the buffer memory occupied by the transmitted log data being usable to store newly acquired log data; establishing a transmission link through a wireless local area network with a communication circuit installed in a second vehicle; and transmitting, by the processor, non-selected log data stored in the buffer memory to the second vehicle through the transmission.

The first aspect of the disclosure may seek to transmit high volume of data captured in a vehicle to a back-end server. A technical benefit may include reducing a risk to flood the buffer memory used to store the log data. In addition, when several vehicles are in or enter the transmission range of the first vehicle a mesh network formed by the wireless links established between the vehicles can be formed.

In some examples, including in at least one preferred example, optionally attributing a priority level to each log data, the selected log data having the highest priority level or levels. A technical benefit may include enabling the selection of log data to be transmitted to the back-end server.

In some examples, including in at least one preferred example, optionally attributing a priority level to each log data, the selected log data have a priority level greater than a priority threshold, and the priority threshold is adjusted as a function of a fill rate of the buffer memory by the log data that are not transmitted. A technical benefit may include enabling the selection of log data to be transmitted to the back-end server to be accurately adjusted to the capacity of the transmission network.

In some examples, including in at least one preferred example, optionally selecting all stored log data when a space usable to store newly acquired log data in the buffer memory is greater than a memory threshold. A technical benefit may include enabling to transmit all log data directly to the back-end server when the capacity of the transmission network is sufficient.

In some examples, including in at least one preferred example, optionally estimating, by the processor, a fill rate of the buffer memory by the log data that are not transmitted, the log data stored in the buffer memory being transmitted to the communication circuit through the transmission link when the fill rate of the buffer memory is higher than a transmission rate of the wide area network. A technical benefit may include avoiding loss of log data.

In some examples, including in at least one preferred example, optionally receiving, by the processor, log data from a second vehicle through a transmission link of the wireless local area network, established with a communication circuit installed in the second vehicle; and storing, by the processor, in the buffer memory the log data received from the second vehicle, to be transmitted to the remote server. A technical benefit may include using the first vehicle to transmit to the back-end server log data from other vehicles in the transmission range of the first vehicle.

In some examples, including in at least one preferred example, optionally encapsulating, by the processor, the log data stored in the buffer memory into data chunks, the log data being transmitted in the data chunks through the transmission link. A technical benefit may include securing the transmission of log data and reducing the risks of data losses.

In some examples, including in at least one preferred example, optionally estimating, by the processor, a bandwidth of the transmission through the transmission link; and adjusting a chunk size of the data chunks as a function of the estimated bandwidth. A technical benefit may include optimizing the use of the bandwidth of the transmission link.

In some examples, including in at least one preferred example, optionally establishing, by the processor, a transmission link to the server through a wireless wide area network.

In some examples, including in at least one preferred example, optionally establishing, by the processor, a transmission link to the server through the wireless local area network linking the processor to a fixed access point, the fixed access point being linked to the server through the wide area network. A technical benefit may include beneficing a transmission link having a higher bandwidth when it is available.

A second aspect of the disclosure may relate to a vehicle electronic system comprising a processing circuitry, and a communication circuit connectable to wireless local area network and a buffer memory connected to the processing circuitry, the vehicle electronic system being installed in a first vehicle, the processing circuitry being configured to implement the method as disclosed above.

A third aspect of the disclosure may relate to a vehicle comprising such a vehicle electronic system.

A fourth aspect of the disclosure may relate to a computer program product comprising program code for performing, when executed by a processing circuitry, the method as disclosed above.

A fifth aspect of the disclosure may relate to a non-transitory computer-readable storage medium comprising instructions, which when executed by the processing circuitry, cause the processing circuitry to perform the method as disclosed above.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, computer-implemented methods, computer readable media, and computer program products associated with the above discussed technical benefits.

BRIEF DESCRIPTION OF THE DRAWINGS

Examples are described in more detail below with reference to the appended drawings in which.

DETAILED DESCRIPTION

The detailed description set forth below provides information and examples of the disclosed technology with sufficient detail to enable those skilled in the art to practice the disclosure.

Figure 1:
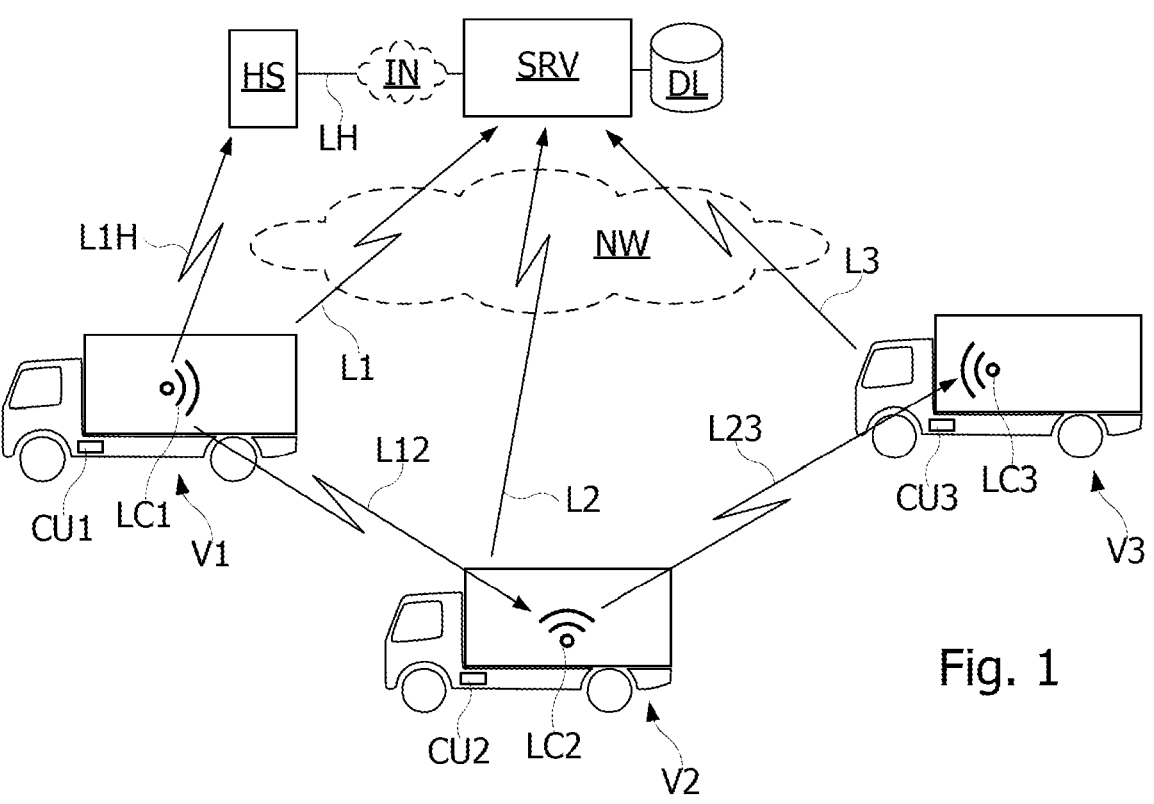
FIG. 1 shows vehicles in communication with each other and with a remote server, according to an example.

FIG. 1 shows vehicles V1, V2, V3 in communication with each other and with a remote server SRV, according to an example. Each of the vehicles V1, V2, V3 comprises a respective computing circuit CU1, CU2, CU3 which is configured to establish a transmission link L1, L2, L3 to the remote server SRV. The communications links L1, L2, L3 are established through a wireless wide area network NW. According to an example, the network NW is a cellular network such as 3G, 4G and/or 5G network. One or more of the computing circuits CU1, CU2, CU3 may further be configured to establish a communication link L1H-LH to the server SRV via a fixed access point HS that can connect the server SRV through a wired wide area network such as the Internet IN, the computer system comprising a communication circuit configured to establish a transmission link L1H to the access point HS via a wireless local area network. According to an example, the access point HS is a WiFi hotspot.

It may be observed that one or more of the communications links L1, L2, L3 can be established through the wireless wide area network NW such as a cellular network to a gateway connected to the server SRV by a wired wide area network such as the Internet IN.

One or more of the computing circuits CU1, CU2, CU3 can be connected to a communication circuit LC1, LC2, LC3 configured to connect a local area network, such as WiFi direct, and establish peer-to-peer communications links L12, L23, L1H to an access point configured by another communication circuit LC2, LC3 installed in another vehicle V2, V3.

Figure 2:
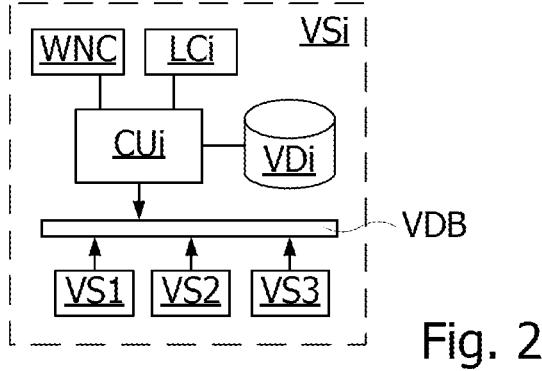
FIG. 2 is a block diagram of a hardware architecture installed in a vehicle, according to an example.

FIG. 2 shows an example of the hardware architecture of a vehicle electronic system VSi that may be installed in one or more of the vehicles V1, V2, V3. The vehicle electronic system VSi comprises a computing circuit CUi which can be one of the computing circuits CU1, CU2, CU3. The computing circuit CUi is connected to a buffer memory VDi and to a bus VDB such as a bus of the type CAN (Controller Area Network). The vehicle electronic system VSi further comprises a communication circuit WNC connected to the computing circuit CUi and configured to establish a communications link such as the communication links L1, L2, L3, through a wireless wide area network NW. The vehicle electronic system VSi further comprises a communication circuit LCi such as one of the communication circuits LC1, LC2, LC3 and configured to establish the communications links such as L12, L23, L1H, through the local area network.

The vehicle electronic system VSi can comprise other systems such as a driver assistance system and a self-driving system, an electronic braking system, an electronic stability control system, a vehicle motion management system, and an active suspension control system.

Figure 3:
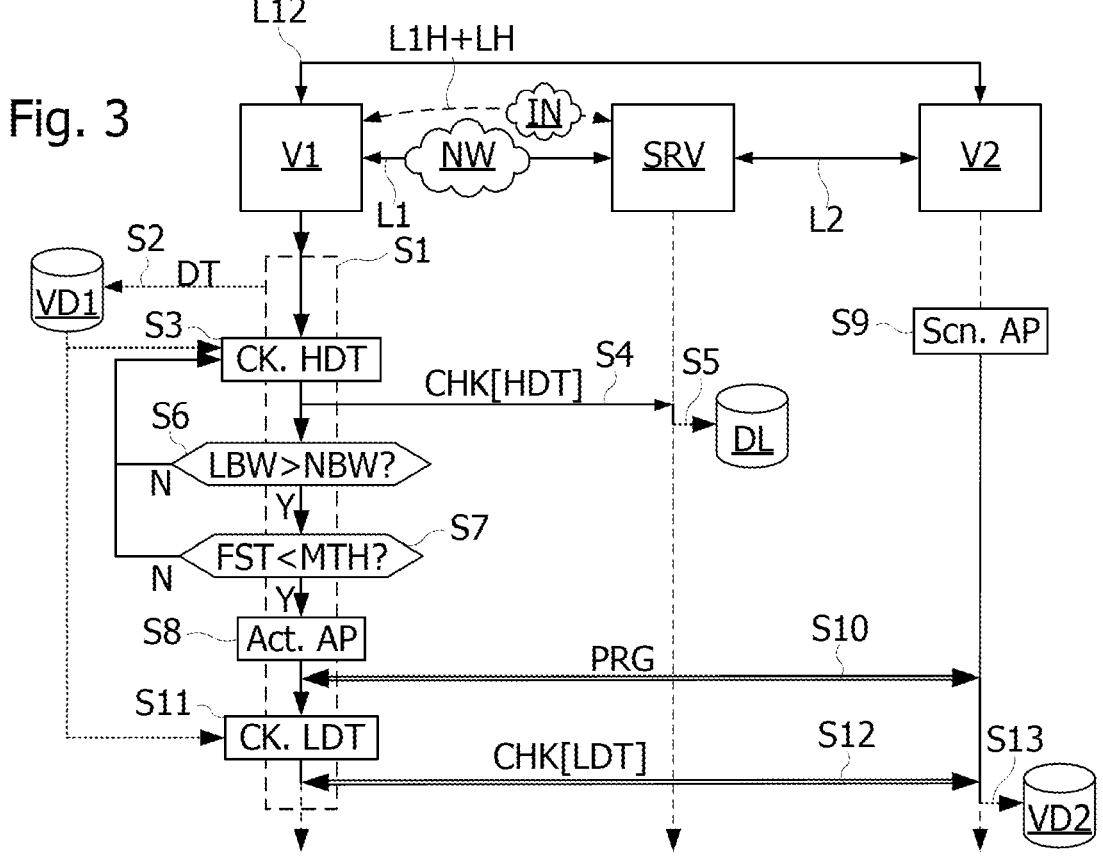
FIG. 3 is a sequence diagram of a method implemented in a vehicle, according to an example.

FIG. 3 shows steps S1 to S13 of a method implemented by the vehicle electronic system VSi (e.g. VS1 and VS2) of vehicles V1, V2 and the server SRV, according to an example. At step S1, the computing circuit CU1 of the vehicle electronic system VS1 acquires log data related to operation of vehicle electronic systems CS1, VS1, VS2, VS3 installed in the vehicle V1. At step S2, the computer system CS1 stores the acquired log data DT in a buffer memory e.g. VD1, of the system VS1. The data logging can be performed regularly for data mining, for debugging and/or for diagnostic. The log data can be of different types, such as a single value acquired at a high rate, images, video, calculation results, software log. The logging of data from a log data source in the system can be triggered when a threshold is exceeded.

Step S2 may be performed during step S1 when the log data DT are acquired. At step S4, the computing circuit CU1 transmits the log data DT stored in its buffer memory VD1 by the link L1 through the network NW to the remote server SRV. If an access point such as HS is in the transmission range of the communication circuit LC1 of the vehicle V1, the computing circuit CU1 may also establish the transmission link L1H+LH to the server SRV and use this link to transmit the log data DT. Both links L1 and L1H+LH can be used at the same time by the computing circuit CU1 in redundancy for safety reason or in combination to benefit a higher transmission rate.

The space in the buffer memory VD1 occupied by transmitted log data DT becomes usable to store newly acquired log data during step S1. The computing circuit CU1 can further encapsulate the log data into data chunks CHK (step S3) and transmit (step S4) the data chunks to the server SRV. At step S5, the server SRV receives the log data and store them in a memory DL. The steps S2 to S5 may be performed a number of times as needed during the acquisition (step S1) of the log data DT.

According to an example, the data chunks CHK are encrypted and signed by the computing circuit CU1 at step S3, prior to be transmitted to the server SRV at step S4.

According to an example, each data is associated with a priority. The computer system CS1 is further configured to select first log data HDT stored in the buffer memory VD1 having the highest priority or priorities and to transmit the selected log data HDT to the remote server SRV by the transmission link L1 through the wide area network NW.

At step S6, the computing circuit CU1 assesses if the generation of log data will flood the buffer memory VD1 before they can be transmitted. Step S6 can be performed by detecting when a space FST usable to store newly acquired log data in the buffer memory decreases or is lower than a memory threshold MTH (step S7), or by estimating the fill rate of the buffer memory VD1 from a log data flow rate and a bandwidth of the network NW. The network bandwidth can be locally measured when estimating the fill rate of the buffer memory.

According to an example, the computing circuit CU1 is configured to estimate a fill rate of the buffer memory by log data LDT in the buffer memory VD1, that are not transmitted by the transmission link L1, and to adjust the priority threshold as a function of the estimated fill rate. The fill rate may be computed as a difference of a load rate of the buffer memory and a transmission rate of the data read in the buffer memory.

All the log data HDT having a priority higher than the priority threshold are transmitted to the server SRV by the transmission link L1 through the wide area network NW or the link L1H+LH.

At step S8, the computing circuit CU1 activates an access point AP configured by the communication circuit LC1. In parallel, the communication circuits LCi of other vehicles Vi are configured to scan their radio environment to find and recognize other access points at step S9. The access point AP of the vehicle V1 may be recognized by the communication circuit LC2 of the vehicle V2 if for example vehicles V1 and V2 are from the same manufacturer. At step S10, if the access point AP activated by the communication circuit LC1 is found by a communication circuit (LC2) of another vehicle, e.g. V2, the computing circuit CU1 establishes with the vehicle V2 the peer-to-peer transmission link L12 between the communication circuits LC1 and LC2.

It may be observed that the peer-to-peer transmission link L12 established between the vehicles V1, V2 may have a long duration when the vehicles V1, V2 are following each other, a short duration when they are stopped at a traffic light and have different displacement directions, and probably too short when they cross on a road. The transmission link L1H established between the vehicle V1 and the fixed access point HS may be present as long as the vehicle V1 stays in the transmission range of the access point HS.

The presence of log data LDT having a priority smaller than the priority threshold in the buffer memory VD1 may be conditioned by the risk of flooding the buffer memory VD1 by log data that are not transmitted to the server SRV. If the transmission rate of the transmission link L1 is sufficient, all log data may be transmitted by the transmission link L1, and thus the establishment of the transmission link L12 may be not needed. This may also happen when a space usable to store newly acquired log data in the buffer memory VD1 is greater than a memory threshold MTH.

According to an example, the memory threshold MTH is adjusted as a function of a distance between the vehicle V1 and a nearest vehicle (e.g. V2). According to an example, the distance between the vehicle V1 and a nearest vehicle can be provided by a server, such as the server SRV, which monitors the respective positions of a vehicle fleet to which the vehicles V1 and V2 belong.

According to an example, the establishment of the peer-to-peer transmission link L12 between the vehicles V1 and V2 comprises an authentication of the computing circuit CU2 by the computing circuit CU1. To this purpose, the computing circuit CU1 requests and checks credentials and/or a certificate from the computing circuit CU2. The transmission link L12 is established if the authentication is successful. According to an example, the authentication is a mutual authentication performed between the computing circuits CU1, CU2. To this purpose, credentials and/or certificates can be exchanged by the computing circuits CU1, CU2.

Then, at step S12, computing circuit CU1 transmits the log data LDT (having the lowest priorities) stored in the buffer memory VD1 through the transmission link L12. The computing circuit CU1 can encapsulate the log data LDT into data chunks CHK (step S11) and transmit (step S12) the data log data LDT in the form of data chunks CHK through the transmission link L12. At step S13, the computing circuit CU2 of the vehicle V2 receives the transmitted data chunks and stores them in its buffer memory VD2.

According to an example, the server SRV is configured to receive data chunks from different vehicles V1, V2, V3 and retrieve the log data transmitted by each vehicle according to an original order in which the data were acquired. To this purpose, the data chunks can include a header specifying an identifier of a vehicle in which the log data in a payload of the data chunk were acquired and a number of data chunk specifying an order in which the payloads of the data chunks from a same vehicle are to be assembled.

Figure 4:
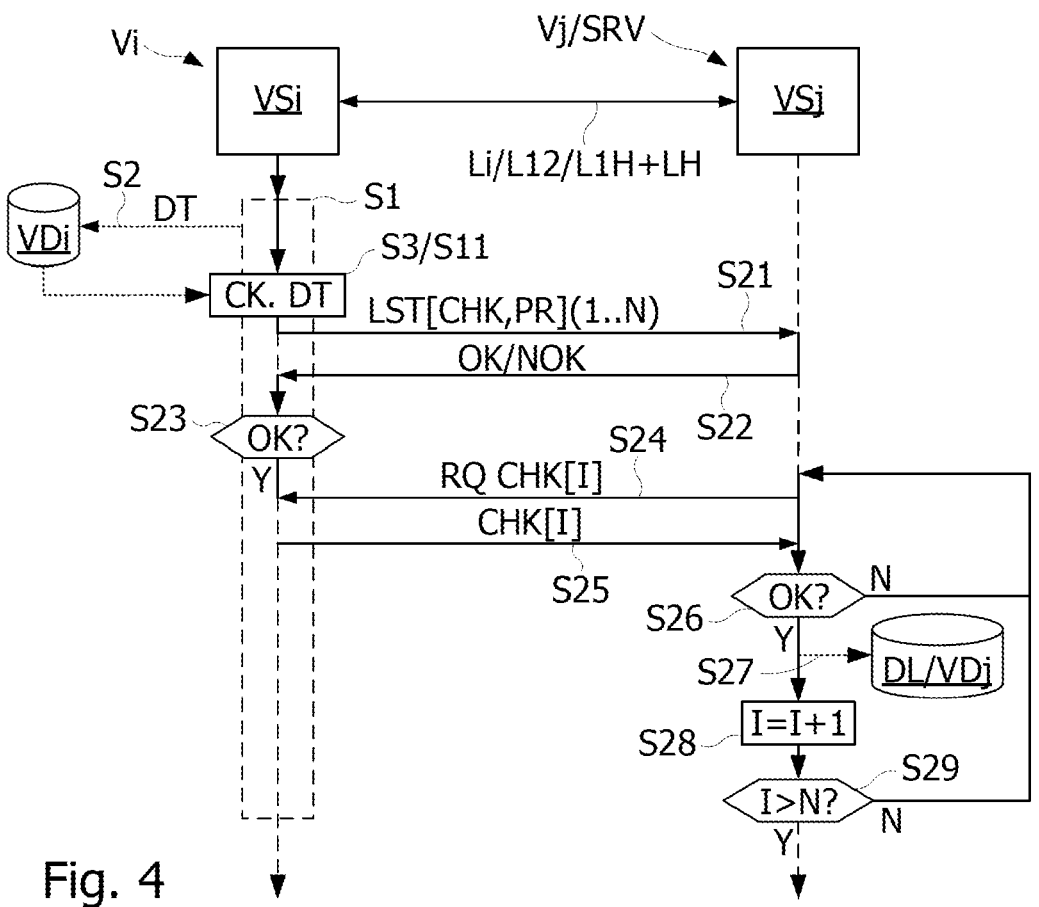
FIG. 4 is a sequence diagram of a method implemented in a vehicle, according to an example.

FIG. 4 shows steps S21 to S29 of a method implemented by one of the vehicle electronic systems VSi of vehicles Vi and another vehicle electronic system VSj of another vehicle Vj or the server SRV (via the network NW or the access point HS), according to an example. Steps S21 to S29 can be executed during step S4 and/or step S12. At step S21, the computing circuit CUi of the vehicle electronic system VSi requests to the vehicle electronic system VSj a data transfer service. The computing circuit CUi may transmit to the computing circuit CUj of the vehicle electronic system VSj a list LST of data chunks CHK(1 . . . . N) to be transmitted. This list may include a priority PR assigned to each data chunk CHK. At step S22, the computing circuit CUj transmits to the computing circuit CUi a response message that acknowledges or rejects the data transfer. At step S23, if the data transfer is acknowledged, the computing circuit CUj may download one by one the data chunks CHK specified in the received list, at steps S24-S29. At step S24, the computing circuit CUj of the vehicle electronic system VSj requests a data chunk CHK[I]. At step S25, the computing circuit CUi transmits to the computing circuit CUj the requested data chunk CHK[I]. Each time a data chunk CHK[I] is detected fully downloaded at step S26, the computing circuit CUj stores the received data chunk in its buffer memory DL/VDj at step S27. If the data chunk CHK[I] is detected fully downloaded at step S26, the computing circuit CUi, CUj may consider that the log data in the downloaded chunk CHK are transmitted at step S27. If the communication circuit LCj of the vehicle electronic system VSj becomes out of range of the communication circuit LCi of the vehicle electronic system VSi during a data chunk download (step S25), the data chunk CHK[I] is considered not transmitted and several transmission retries may be attempted by executing the steps from step S24. Steps S28 and S29 are executed after a successful download of the data chunk CHK[I]. At steps S28 and S29, the computing circuit CUj checks if there is another data chunk CHK[I+1] to download in the list LST and if such data chunk exists, steps S24 to S29 are executed again to download a next data chunk CHK[I+1] and to prepare downloading a next data chunk in the list LST.

According to an example, the computing circuit CUi is configured to estimate a bandwidth of the transmission through the transmission link L12 and adjust a chunk size of the chunks CHK transmitted at steps S12 and/or S24 as a function of the estimated bandwidth.

It may be observed that the steps S4, S6-S10 and S12 can be executed by the vehicle V2 when it receives data chunks CHK from another vehicle V1 or V3. The log data are already encapsulated into data chunks that are stored in the buffer memory VDj, VD2 and thus do not need to be encapsulated into data chunks at steps S3 and S11. Thus, the computing circuit CUj (e.g. CU2) connected to the communication circuit LC2 is configured to receive the log data that are transmitted by the computing circuit CU1, and store these data in its buffer memory VD2. The computing circuit CU2 can be configured as the computing circuit CU1 to transmit the received log data to the server SRV at steps S4, S6-S10 and S12. Therefore, the log data DT can be transmitted directly by the computing circuit CU2 to the server SRV through the network NW or the fixed access point HS, and/or using another transmission link established with another vehicle such as the vehicle V3 by means of the communication circuit LC3 of the vehicle V3.

According to an example, the data chunks are encrypted and signed by the processing circuit CU1, so that the vehicle V2 cannot access their content. In addition, the vehicle V2 may be configured to discard tracks of the origin of the transferred data chunks for confidentiality and data protection purpose.

Figure 5:
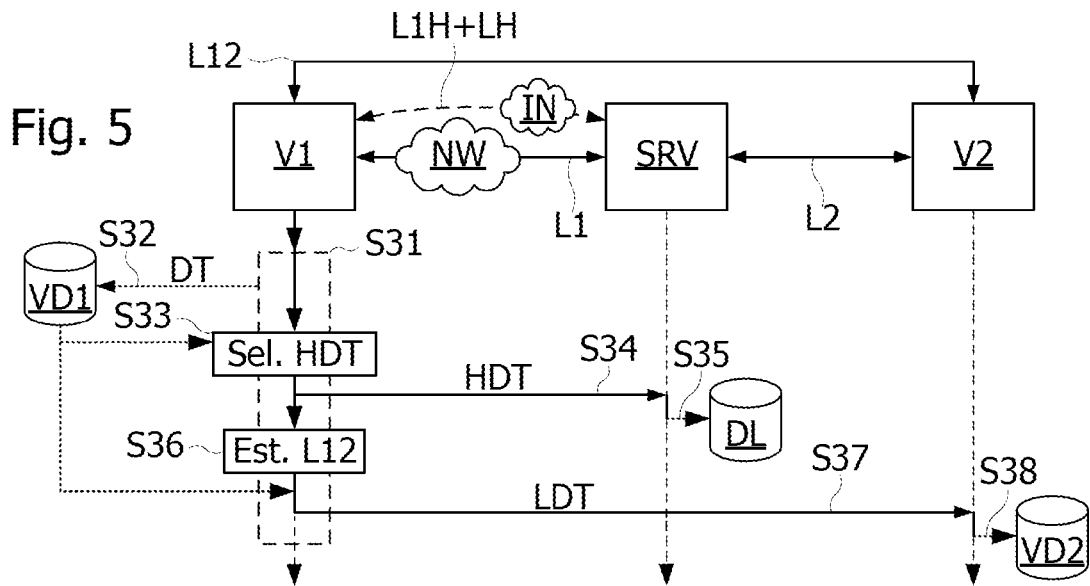
FIG. 5 is a sequence diagram of a method implemented in a vehicle, according to another example.

FIG. 5 shows steps S31 to S38 of a method for acquiring log data related to operation of a vehicle electronic system VSi (e.g. VS1 and VS2) of vehicles V1, V2 and the server SRV, according to another example. At step 31, the computing circuit CU1 of the electronic system VS1 installed in the vehicle V1 acquires log data DT related to operation of the vehicle electronic system. At step S32, the computing circuit CU1 stores the log data in a buffer memory VD1 of the first vehicle. At step S33, the computing circuit CU1 selects log data among the log data stored in the buffer memory. At step S34, the computing circuit CU1 transmits the selected log data HDT to the remote server SRV through the wide area network NW, IN. Thus, a free space or a space in the buffer memory occupied by the transmitted log data HDT being usable to store newly acquired log data DT, at step S31. At step S35, the server SRV receives the transmitted data HDT and stores them in a memory DL. At step S36, the computing circuit CU1 establishes with a second vehicle V2 a transmission link L12 through a wireless local area network. At step S37, the computing circuit CU1 transmits non-selected log data LDT stored in the buffer memory VD1 through the transmission link L12. At step S38, the processing circuit CU2 of the vehicle V2 stores the received data LDT in a buffer memory VD2 of the vehicle V2.

It may be observed that the steps S10, S12, S13, S22, S25, S26 and S38 can be executed by the vehicle electronic system VS1 of vehicle V1, which can be configured to receive log data DT from other vehicles, such as V2 or V3.

Figure 6:
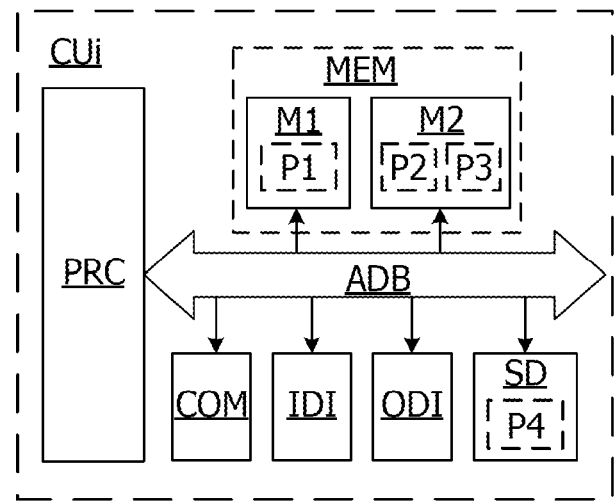
FIG. 6 is a schematic diagram of an exemplary computer system for implementing examples disclosed herein, according to an example.

FIG. 6 is a schematic diagram of a computing circuit CUi for implementing examples disclosed herein. The computing circuit CUi is adapted to execute instructions from a computer-readable medium to perform these and/or any of the functions or processing described herein. The computing circuit CUi may be connected (e.g., networked) to other machines in a LAN, an intranet, an extranet, or the Internet. While only a single device is illustrated, the computing circuit CUi may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computing circuit CUi may comprise at least one computing device or electronic device capable of including firmware, hardware, and/or executing software instructions to implement the functionality described herein. The computing circuit CUi may include processing circuitry PRC (e.g., processing circuitry including one or more processor devices or control units), a memory MEM, and a system bus ADB. The computing circuit CUi may include at least one computing device having the processing circuitry PRC. The system bus ADB provides an interface for system components including, but not limited to, the memory MEM and the processing circuitry PRC. The processing circuitry PRC may include any number of hardware components for conducting data or signal processing or for executing computer code stored in memory MEM. The processing circuitry PRC may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry PRC may further include computer executable code that controls operation of the programmable device.

The system bus ADB may be any of several types of bus structures that may further interconnect to a memory bus (with or without a memory controller), a peripheral bus, and/or a local bus using any of a variety of bus architectures. The memory MEM may be one or more devices for storing data and/or computer code for completing or facilitating methods described herein. The memory MEM may include database components, object code components, script components, or other types of information structure for supporting the various activities herein. Any distributed or local memory device may be utilized with the systems and methods of this description. The memory MEM may be communicably connected to the processing circuitry PRC (e.g., via a circuit or any other wired, wireless, or network connection) and may include computer code for executing one or more processes described herein. The memory MEM may include one or more non-volatile memories M1 (e.g., read-only memory (ROM), erasable programmable read-only memory (EPROM), electrically erasable programmable read-only memory (EEPROM), etc.), and volatile memory M2 (e.g., random-access memory (RAM)), or any other medium which can be used to carry or store desired program code in the form of machine-executable instructions or data structures and which can be accessed by a computer or other machine with processing circuitry PRC. A basic input/output system (BIOS) P1 may be stored in the non-volatile memory M1 and can include the basic routines that help to transfer information between elements within the computing circuit CUi.

The computing circuit CUi may further include or be coupled to a non-transitory computer-readable storage medium such as the storage device SD, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device SD and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device SD and/or in the volatile memory M2, which may include an operating system P2 and/or one or more program modules P3. All or a portion of the examples disclosed herein may be implemented as a computer program P4 stored on a transitory or non-transitory computer-usable or computer-readable storage medium (e.g., single medium or multiple media), such as the storage device SD, which includes complex programming instructions (e.g., complex computer-readable program code) to cause the processing circuitry PRC to carry out actions described herein. Thus, the computer-readable program code of the computer program P4 can comprise software instructions for implementing the functionality of the examples described herein when executed by the processing circuitry PRC. In some examples, the storage device SD may be a computer program product (e.g., readable storage medium) storing the computer program P4 thereon, where at least a portion of a computer program P4 may be loadable (e.g., into a processor) for implementing the functionality of the examples described herein when executed by the processing circuitry PRC. The processing circuitry PRC may serve as a controller or control system for the computing circuit CUi that is to implement the functionality described herein.

The computing circuit CUi may include an input device interface IDI configured to receive input and selections to be communicated to the computing circuit CUi when executing instructions, such as from a keyboard, mouse, touch-sensitive surface, etc. Such input devices may be connected to the processing circuitry PRC through the input device interface IDI coupled to the system bus ADB but can be connected through other interfaces, such as a parallel port, an Institute of Electrical and Electronic Engineers (IEEE) 1394 serial port, a Universal Serial Bus (USB) port, an IR interface, and the like. The computing circuit CUi may include an output device interface ODI configured to forward output, such as to a display, a video display unit (e.g., a liquid crystal display (LCD) or a cathode ray tube (CRT)). The computing circuit CUi may include a communications interface COM suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

A first example relates to a vehicle electronic system VS1, VS2, VSi comprising a computing circuit CU1, and communication circuit LC1 to wireless local area network and a buffer memory VD1 connected to the computing circuit, the vehicle electronic system being installed in a first vehicle V1, the computing circuit CU1 being configured to:

acquire log data DT related to operation of the vehicle electronic system;

store the acquired log data in the buffer memory;

select log data HDT among the log data stored in the buffer memory;

transmit the selected log data HDT to a remote server SRV through a wide area network NW, IN, a free space or a space in the buffer memory occupied by the transmitted log data being usable to store newly acquired log data DT;

establish a transmission link L12 with a communication circuit LC2 installed in a second vehicle V2 through a wireless local area network; and transmit non-selected log data LDT stored in the buffer memory through the transmission link.

A second example relates to the vehicle electronic system of the first example, wherein a priority level PR is attributed to each log data DT, the selected log data having the highest priority level or levels.

A third example relates to the vehicle electronic system of the first or second example, wherein a priority level PR is attributed to each log data DT, the selected log data HDT having a priority level greater than a priority threshold, and the priority threshold is adjusted as a function a fill rate of the buffer memory VD1 by the log data DT that are not transmitted.

According to a fourth example, all stored log data DT are selected when a space usable to store newly acquired log data in the buffer memory VD1 is greater than a memory threshold MTH.

A fifth example relates to the vehicle electronic system of the fourth example, wherein the memory threshold MTH is adjusted as a function of a distance between the first vehicle V1 and a nearest vehicle V2 configured to establish the transmission link L12 through the wireless local area network with the first vehicle.

According to a sixth example, the computing circuit CU1 is further configured to estimate a fill rate of the buffer memory VD1 by the log data LDT that are not transmitted, the log data stored in the buffer memory being transmitted to the communication circuit LC2 through the transmission link L12 when the fill rate of the buffer memory is higher than a transmission rate of the wide area network NW, L1H/LH.

According to a seventh example, the computing circuit CU1 is further configured to receive log data from a second vehicle V2 through a transmission link L12 of the wireless local area network established with a communication circuit LC2 installed in the second vehicle; and store in the buffer memory VD1 the log data received from the second vehicle, to be transmitted to the remote server SRV.

According to a eighth example, the computing circuit CU1 is further configured to encapsulate the log data stored in the buffer memory VD1 into data chunks, the log data LDT being transmitted in the data chunks through the transmission link L12.

A ninth example relates to the vehicle electronic system of the eighth example wherein the computing circuit CU1 is further configured to estimate a bandwidth of the transmission through the transmission link L12; and adjust a chunk size of the data chunks (CHK as a function of the estimated bandwidth.

According to a tenth example, the computing circuit CU1 is further configured to establish a transmission link to the server SRV through a wireless wide area network NW.

According to a eleventh example, the computing circuit CU1 is further configured to establish a transmission link to the server SRV through the wireless local area network linking the processor to a fixed access point HS, the fixed access point being linked to the server through the wide area network IN.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer-implemented method for acquiring log data related to operation of a vehicle electronic system, the method comprising:
   acquiring, by a processor of an electronic system installed in a first vehicle, operational log data related to operation of the electronic system of the first vehicle;
   storing, by the processor, the operational log data in a buffer memory of the electronic system of the first vehicle;
   selecting, by the processor, a subset of operational log data among the operational log data stored in the buffer memory, wherein the selected subset of operational log data corresponds to data designated for immediate transmission to a remote server;
   transmitting, by the processor, the selected subset of operational log data to the remote server through a wide area network (WAN), a free space or a space in the buffer memory occupied by the transmitted subset of operational log data being usable to store newly acquired operational log data;
   establishing a transmission link through a wireless local area network (WLAN) with a communication circuit installed in a second vehicle; and
   transmitting, by the processor, non-selected operational log data stored in the buffer memory to the second vehicle through the WLAN transmission link, wherein the non-selected log data is transmitted to the second vehicle for subsequent transmission to the remote server, wherein the non-selected log data includes operational log data other than the selected subset operational log data.

2. The method of claim 1, wherein a priority level is attributed to each operational log data, the selected subset of operational log data having the highest priority level or levels.

3. The method of claim 1, wherein:
   a priority level is attributed to each operational log data,
   the selected subset of operational log data having a priority level greater than a priority threshold, and
   the priority threshold is adjusted as a function of a fill rate of the buffer memory by the operational log data that are not transmitted.

4. The method of claim 1, wherein all stored operational log data are selected when a space usable to store newly acquired operational log data in the buffer memory is greater than a memory threshold.

5. The method of claim 4, wherein the memory threshold is adjusted as a function of a distance between the first vehicle and a nearest vehicle configured to establish the transmission link through the wireless local area network with the first vehicle.

6. The method of claim 1, further comprising estimating, by the processor, a fill rate of the buffer memory by the operational log data that are not transmitted, the operational log data stored in the buffer memory being transmitted to the communication circuit through the transmission link when the fill rate of the buffer memory is higher than a transmission rate of the wide area network.

7. The method of claim 1, further comprising:

receiving, by the processor, operational log data from the second vehicle through a transmission link of the wireless local area network, established with the communication circuit installed in the second vehicle; and storing, by the processor, in the buffer memory the operational log data received from the second vehicle, to be transmitted to the remote server.

8. The method of claim 1, further comprising encapsulating, by the processor, the operational log data stored in the buffer memory into data chunks, the operational log data being transmitted in the data chunks through the transmission link.

9. The method of claim 8, further comprising:

estimating, by the processor, a bandwidth of the transmission through the transmission link; and adjusting a chunk size of the data chunks as a function of the estimated bandwidth.

10. The method of claim 1, further comprising establishing, by the processor, a transmission link to the server through a wireless wide area network.

11. The method of claim 1, further comprising establishing, by the processor, a transmission link to the server through the wireless local area network linking the processor to a fixed access point, the fixed access point being linked to the server through the wide area network.

12. A vehicle electronic system comprising a computing circuit, and a communication circuit connectable to a wireless local area network and a buffer memory connected to the computing circuit, the vehicle electronic system being installed in a first vehicle, the computing circuit being configured to implement the method of claim 1.

13. A non-transitory computer-readable storage medium comprising instructions, which when executed by a processing circuitry, cause the processing circuitry to perform the steps comprising:

acquiring, by a processor of an electronic system installed in a first vehicle, operational log data related to operation of the electronic system of the first vehicle;

storing, by the processor, the operational log data in a buffer memory of the electronic system of the first vehicle;

selecting, by the processor, a subset of operational log data among the operational log data stored in the buffer memory, wherein the selected subset of operational log data corresponds to data designated for immediate transmission to a remote server;

transmitting, by the processor, the selected subset of operational log data to the remote server through a wide area network (WAN), a free space or a space in the buffer memory occupied by the transmitted subset of operational log data being usable to store newly acquired operational log data;

establishing a transmission link through a wireless local area network (WLAN) with a communication circuit installed in a second vehicle; and transmitting, by the processor, non-selected operational log data stored in the buffer memory to the second vehicle through the WLAN transmission link, wherein the non-selected log data is transmitted to the second vehicle for subsequent transmission to the remote server, wherein the non-selected log data includes operational log data other than the selected subset operational log data.

\* \* \* \* \*